(12) United States Patent
Johnson

(10) Patent No.: US 10,582,045 B1
(45) Date of Patent: *Mar. 3, 2020

(54) PORTED AND DISCONNECTED WIRELESS NUMBER DISTINCTION BASED ON NUMBER PORTABILITY DATABASE STATUS AND OPTED-IN FILE STATUS

(71) Applicant: West Corporation, Omaha, NE (US)

(72) Inventor: Rebekah Johnson, Grand Bay, AL (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,009

(22) Filed: Feb. 19, 2019

Related U.S. Application Data

(63) Continuation of application No. 15/906,318, filed on Feb. 27, 2018, now Pat. No. 10,212,273, which is a continuation of application No. 14/960,555, filed on Dec. 7, 2015, now Pat. No. 9,906,644.

(51) Int. Cl.
*H04M 3/42* (2006.01)

(52) U.S. Cl.
CPC ... *H04M 3/42178* (2013.01); *H04M 3/42153* (2013.01); *H04M 3/42297* (2013.01)

(58) Field of Classification Search
None
See application file for complete search history.

(56) References Cited

U.S. PATENT DOCUMENTS

| | | | | |
|---|---|---|---|---|
| 2004/0196858 A1* | 10/2004 | Tsai | ........................ | H04L 45/00 370/401 |
| 2005/0186950 A1* | 8/2005 | Jiang | ................. | H04M 3/42229 455/417 |
| 2013/0129066 A1* | 5/2013 | Yeung | ............... | H04M 3/42297 379/211.01 |

* cited by examiner

*Primary Examiner* — Idowu O Osifade

(57) ABSTRACT

Providing ported and disconnected wireless number distinction, comprising: receiving, by at least one processor, an aggregator data file containing at least one of at least one wireless number that has been ported and at least one wireless number that has been disconnected, accessing, by the at least one processor, a number portability database, receiving, by the at least one processor, at least one of text and voice call opted-in data file, determining, by the at least one processor, a conjunction of the aggregator data file and number portability database, the conjunction defining a ported data file, determining, by the at least one processor, a commonality of the at least one of a text and a voice call opted-in data file and the ported data file, the commonality defining a ported opted-in data file, recording, in at least one memory, a status of the commonality of the ported opted-in data file as opted-in wireless numbers, wherein the at least one processor and at least one memory are communicably coupled and reestablishing, by the at least one processor, based on the opted-in wireless numbers at least one subscription service to at least one mobile device.

20 Claims, 6 Drawing Sheets

PORTED AND DISCONNECTED WIRELESS NUMBER DISTINCTION BASED ON NUMBER PORTABILITY DATABASE STATUS AND OPTED-IN FILE STATUS

This application is a Continuation from U.S. patent application Ser. No. 15/906,318, filed Feb. 27, 2018, and entitled "PORTED AND DISCONNECTED WIRELESS NUMBER DISTINCTION BASED ON NUMBER PORTABILITY DATABASE STATUS AND OPTED-IN FILE STATUS", now U.S. Pat. No. 10,212,273, issued Feb. 19, 2019, which is a Continuation from U.S. patent application Ser. No. 14/960,555, filed Dec. 7, 2015, and entitled "PORTED AND DISCONNECTED WIRELESS NUMBER DISTINCTION BASED ON NUMBER PORTABILITY DATABASE STATUS AND OPTED-IN FILE STATUS", now U.S. Pat. No. 9,906,644, issued Feb. 27, 2018, the entire contents of each of which is incorporated by reference herein in its entirety.

BACKGROUND

The present disclosure is generally related to distinguishing between ported and disconnected wireless numbers received from aggregators or carriers.

Wireless customers are allowed to port their wireless numbers when moving or changing service providers. This change in service providers affects not only the routing of a wireless call, but the reception of text messages that the subscriber has previously signed up for. Currently, carrier's list numbers that have both been ported or disconnected in one file, and do not distinguish between the two. In order to comply with best practices and legislation, it is necessary to cancel all reception of text files or voice files to numbers contained in the list due to the lack of information to ascertain whether the number was ported or disconnected.

Therefore, ascertaining whether a wireless number was ported to another carrier or disconnected is sought so that disconnected numbers receive a change of state from opted-in to opted-out and ported numbers may retain their opted-in status.

SUMMARY

In one embodiment, a method comprises at least one of: receiving, by at least one processor, an aggregator data file containing at least one of at least one wireless number that has been ported and at least one wireless number that has been disconnected, accessing, by the at least one processor, a number portability database, receiving, by the at least one processor, at least one of a text and a voice call opted-in data file, determining, by the at least one processor, a conjunction of the aggregator data file and number portability database, the conjunction defining a ported data file, determining, by the at least one processor, a commonality of at least one of the text the voice calls opted-in data file and the ported data file, the commonality defining a ported opted-in data file, recording, in at least one memory, a status of the commonality of the ported opted-in data file as opted-in wireless numbers, wherein the at least one processor and at least one memory are communicably coupled and reestablishing, by the at least one processor, based on the opted-in wireless numbers at least one subscription service to at least one mobile device.

In another embodiment, a non-transitory computer readable medium comprises instructions that when read by a processor performs at least one of: receives, by the at least one processor, an aggregator data file containing at least one of at least one wireless number that has been ported and at least one wireless number that has been disconnected, accesses, by the at least one processor, a number portability database, receives, by the at least one processor, at least one of a text and a voice calls opted-in data file, determines, by the at least one processor, a conjunction of the aggregator data file and number portability database, the conjunction defining a ported data file, determines, by the at least one processor, a commonality of at least one of the text and the voice calls opted-in data file and the ported data file, the commonality defining a ported opted-in data file, records, in at least one memory, a status of the commonality of the ported opted-in data file as opted-in wireless numbers, wherein the at least one processor and at least one memory are communicably coupled and reestablishes, by the at least one processor, based on the opted-in wireless numbers at least one mobile device to at least one subscription service.

In a further embodiment, a system comprises at least one processor, wherein the at least one processor performs at least one of: receiving, by the at least one processor, an aggregator data file containing at least one of at least one wireless number that has been ported and at least one wireless number that has been disconnected, accessing, by the at least one processor, a number portability database, receiving, by the at least one processor, at least one of a text and a voice calls opted-in data file, determining, by the at least one processor, a conjunction of the aggregator data file and number portability database, the conjunction defining a ported data file, determining, by the at least one processor, a commonality of the at least one of the text and the voice calls opted-in data file and the ported data file, the commonality defining a ported opted-in data file, recording, in at least one memory, a status of the commonality of the ported opted-in data file as opted-in wireless numbers, wherein the at least one processor and at least one memory are communicably coupled and reestablishing, by the at least one processor, based on the opted-in wireless numbers at least one mobile device to at least one subscription service.

DETAILED DESCRIPTION

Figure 1:
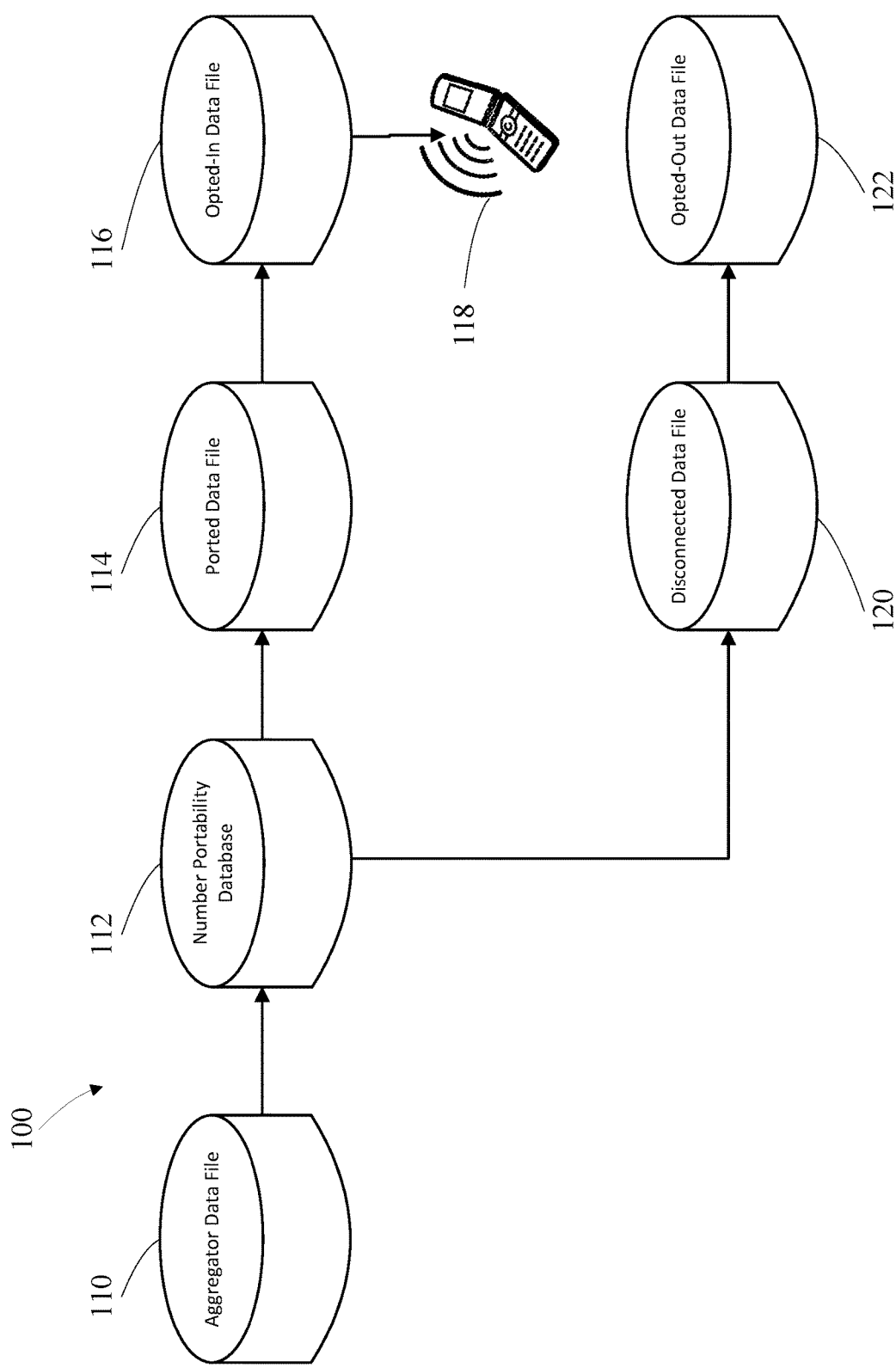
FIG. 1 depicts a first example system in accordance with one embodiment of the disclosure.

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

Currently, an aggregator file contains all numbers as reported by carriers which have been ported/disconnected but does not distinguish between the two. An aggregator could upload 6 to 7 files on average per day. Some carriers publish daily, others publish weekly. Mobile marketing association (MMA) best practices and the cellular telecommunications and internet association (CTIA) require disconnected cell numbers to be opted-out of texting programs. Ported cell numbers may still receive texting programs. However, due to the inability to tell whether the number has been disconnected or ported, all cell numbers on the aggregated list are opted out just to be safe. Federal Communications Commission ("FCC") approved a Declaratory Ruling and Order ("Ruling") regarding the Telephone Consumer Protection Act ("TCPA") and its implementing Rules. The Ruling became effective upon its release Jul. 10, 2015. A major TCPA concern which has developed is calls made to wireless numbers which have been reassigned to new subscribers without the knowledge of the calling entity. The Federal Communications Commission Declaratory Ruling and Order, Jul. 10, 2015, clarifies the TCPA requires the consent of the current subscriber (or non-subscriber customary user of the phone), not the intended recipient of the call/text and finds the "called party" is the subscriber to the cell phone (the person assigned the phone number and billed for the call), or the non-subscriber customary user of a telephone number included in a family or business calling plan. Both such individuals may provide prior express consent to be called at that number. Before a number can be reassigned, it must first be disconnected. Opting-out numbers which have been disconnected, prevents the called party from TCPA violations related to calling reassigned numbers.

It is envisioned that a determination be made as to which numbers in the aggregator file are still in the Number Portability Administration Centers (NPAC) file. If the number in the aggregator file is still in the NPAC file, the number has been ported. Ported numbers are then reviewed against the opted-in file and those ported numbers in the opted-in file to continue their opted-in status. If the numbers in the aggregator file are not in the NPAC file, the number has been disconnected. Disconnected numbers are reviewed against the opt-in file, to change the status of those numbers from opt-in to opt-out. No un-necessary opting out of ported numbers needs to take place and disconnected numbers receive a change of state from opted-in to opted-out, thus fulfilling best practices and regulations.

Computer System FIG. 1 illustrates the system architecture for an exemplary computer system 100 with which the current disclosure may be implemented. The exemplary computer system of FIG. 1 is for descriptive purposes.

System 100 includes reception of an aggregator data file 110 which includes numbers that have been changed and comprises ported and disconnected wireless numbers. However, the aggregator data file does not distinguish between ported and disconnected wireless numbers. A number portability database (NPDB) 112 from the number portability administration center (NPAC) includes local routing numbers (LRN), mobile directory number (MDN) and mobile identification number (MIN). By comparing the aggregator data file with a Number Portability Administration Centers (NPAC) data file to determine overlap, ported wireless numbers may be distinguished from disconnected wireless numbers. Wireless numbers which are in the aggregator data file but are not identified in the NPAC data file are determined to be disconnected. A ported data file 114 is reviewed against the numbers identified as being common to both the aggregator data file and the number portability database to populate a ported data file containing numbers which have not been disconnected, but merely ported from one carrier to another. This ported data file 114 is compared to at least one of text and voice call opted-in data file to determine which numbers had been previously opted-in to specific subscriptions for receiving at least one of texts and voice calls, this is the at least one of text and voice call opted-in data file 116. The numbers from the at least one of text and voice call opted-in data file are then sent to a mobile device 118 which continues the subscription to the new porting.

System 100 compares the aggregator data file with a Number Portability Administration Centers (NPAC) data file to determine overlap, in this way ported wireless numbers may be distinguished from disconnected wireless numbers. This list of disconnected wireless numbers is then evaluated against wireless numbers in an opt-in table to then differentiate the wireless number as opted-in or opted-out. By doing so, this prevents a disconnected wireless number from receiving future at least one of texts and voice calls where consent no longer exists. Wireless numbers not identified in the NPAC data file 112 but which are in the aggregator data file 110 are determined to be disconnected and are placed in a disconnected data file 120 which is used to form at least one of text and voice call opted-out data file 122 that discontinues at least one of text and voice call subscriptions to that wireless number.

Figure 2:
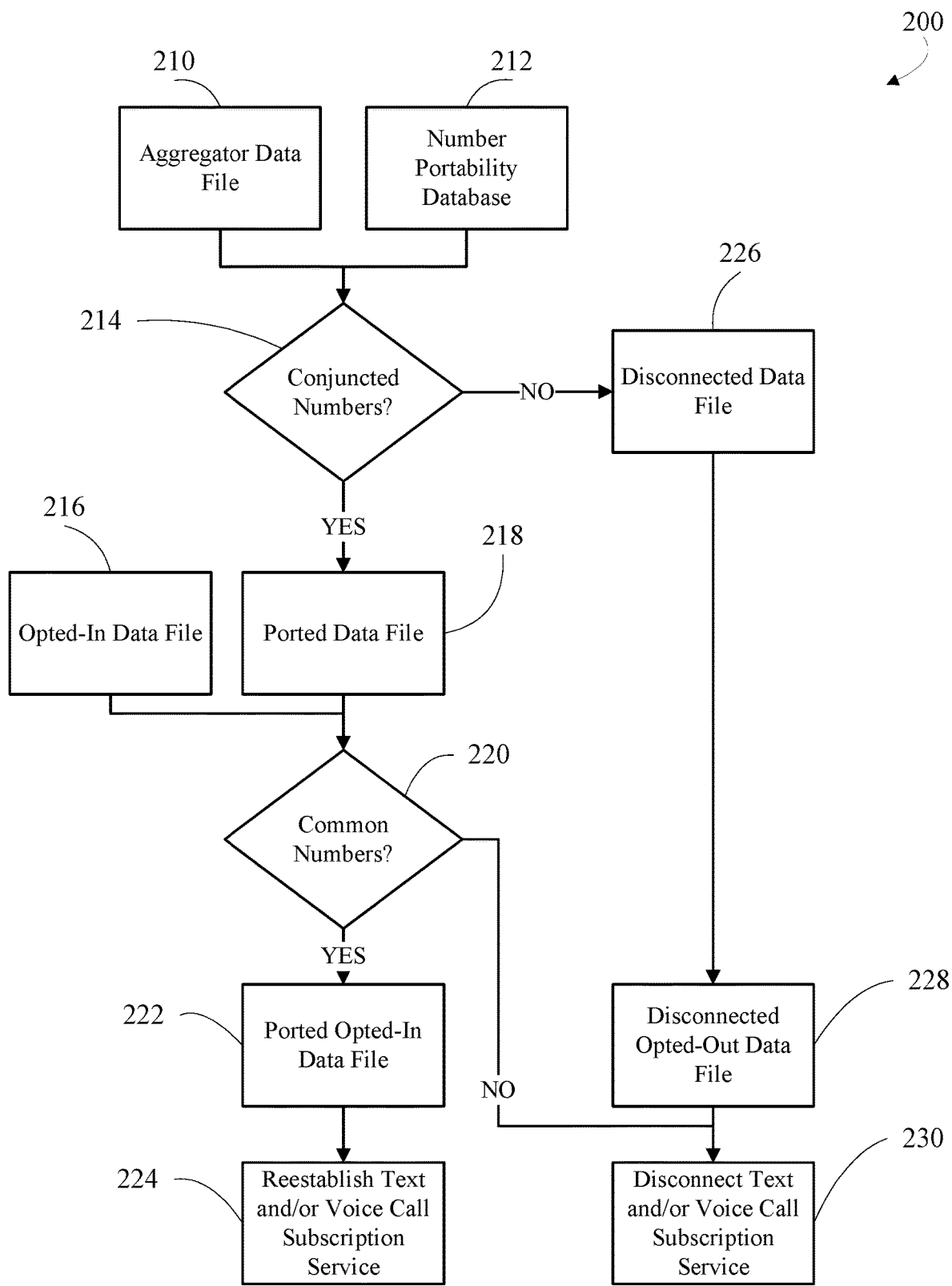
FIG. 2 depicts an example logic flow in accordance with one embodiment of the disclosure.

Referring now to FIG. 2, an example logic flow diagram is depicted. An aggregator data file 210 of the ported and disconnected numbers is received; also a number portability database (NPDB) 212 is accessed by the system. A determination 214 is made as to whether wireless numbers are contained in both the aggregator data file 210 and the number portability database 212, if the wireless number is contained in both, then that wireless number is determined to have been ported, i.e. YES. If the wireless number in the aggregator data file is not contained in the NPDB, then the wireless number is determined to have been disconnected, i.e. NO. Those wireless numbers in both the aggregator data file and the NPDB are placed in a ported data file 218. The ported data file 218 and a text opted-in data file 216 are then compared 220 to determine whether there are wireless numbers that are common both the ported data file and the text opted-in data file. Those wireless numbers that are common are placed in a ported opted-in data file so that a reestablishment 224 of at least one of text and voice call subscription services to a mobile device associated with the ported number is performed.

If the wireless number in the aggregator data file 210 is not contained in the NPDB 212, then the wireless number is determined to have been disconnected and the wireless number is placed in a disconnected data file 226 which is sent to a disconnected opted-out data file 228 to disconnect 230 at least one of text and voice call subscription services from that wireless number. Additionally, the ported data file 218 and a text opted-in data file 216 are compared 220 to determine whether there are wireless numbers that are common both the ported data file and the text opted-in data file, if not, then the number is sent to the disconnect 230 at least one of text and voice call subscription service to disconnect at least one of text and voice call subscription services to that wireless number.

In each of these examples a trigger that something has occurred is based on the ported/disconnect file. Since this file includes ported and disconnected numbers, a determination is performed to distinguish between the two in order to opt-out disconnected numbers and to keep the ported numbers in the state they were before the porting took place. Using the trigger file, numbers matching the customer database would create a list to then be processed for distinction of ported or disconnected. For numbers not found in the local number portability (LNP) database managed by Number Portability Administration Center (NPAC), the number in the customer database may be marked as opted-out.

In another example company ABC's customer (Jane Doe) enters her cell number in the preference solution to receive prescription refill reminders. Given proper consent language, this constitutes prior express consent for Company ABC to deliver these voice calls/text messages to the current cell phone subscriber of 222-333-4444. At a point in time, the subscriber's number is disconnected at the carrier (default on payment/per request/etc.) and wireless number 222-333-4444 appears in the carrier ported/disconnect files delivered from the aggregator. The system will match the number to a preference record in Company ABC database, send the list of matching numbers to local number portability (LNP) database, the LNP determines that the wireless number appears in the ported number list from AT&T and returns results. The wireless numbers not found in the LNP database are recognized as disconnected numbers and are marked as opted-out. Company ABC triggers a prescription refill reminder for Jane Doe (222-333-4444) and the outbound notification is blocked from occurring due to wireless number being marked as opted-out.

Figure 3:
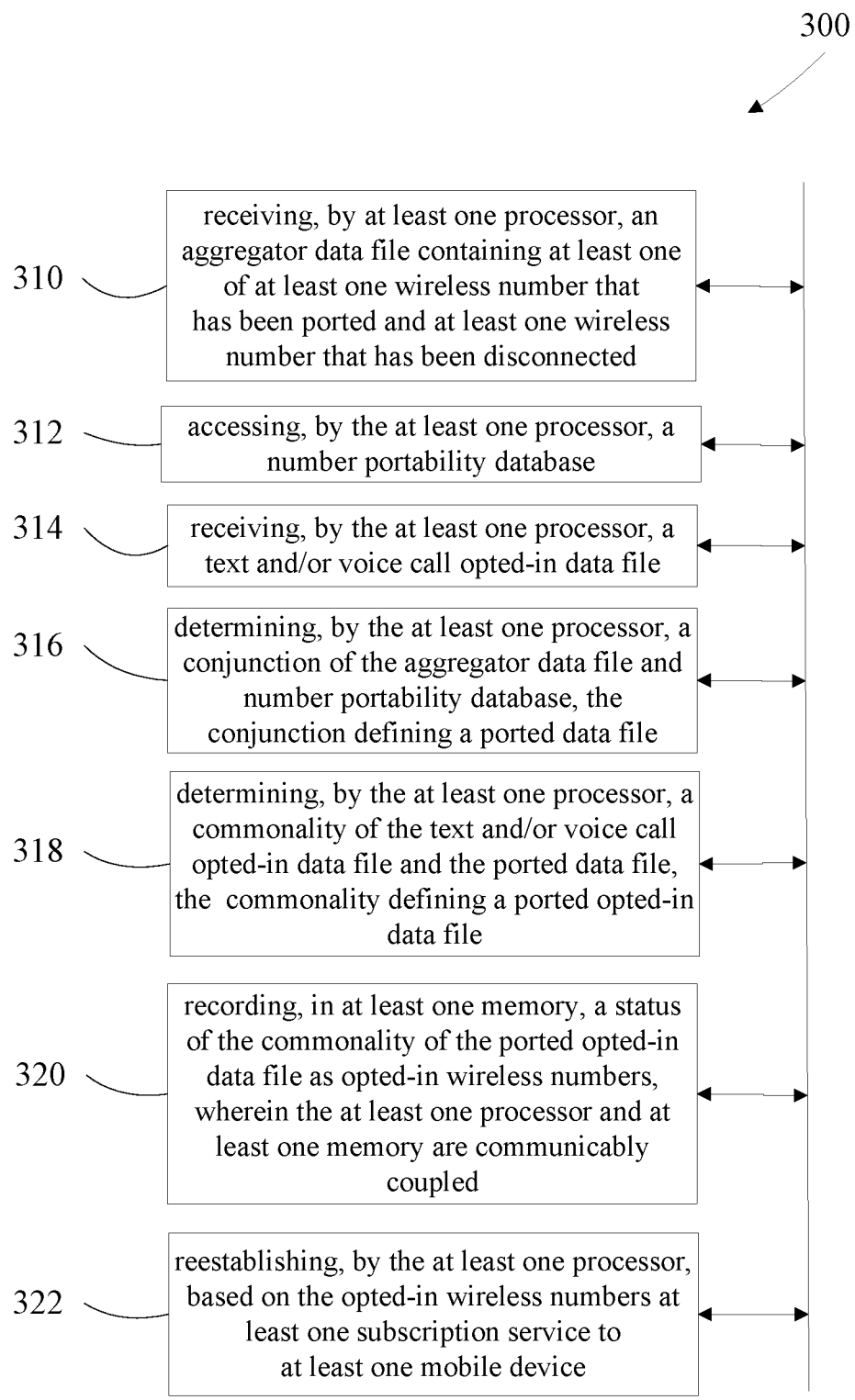
FIG. 3 depicts a first example method in accordance with one embodiment of the disclosure.

Referring now to FIG. 3, a method, comprising receiving 310, by at least one processor, an aggregator data file containing at least one of at least one wireless number that has been ported and at least one wireless number that has been disconnected, accessing, 312 by the at least one processor, a number portability database and receiving 314, by the at least one processor, at least one of a text and a voice call opted-in data file. The method also comprises determining 316, by the at least one processor, a conjunction of the aggregator data file and number portability database, the conjunction defining a ported data file, determining 318, by the at least one processor, a commonality of at least one of the text and voice call opted-in data file and the ported data file, the commonality defining a ported opted-in data file, recording 320, in at least one memory, a status of the commonality of the ported opted-in data file as opted-in wireless numbers, wherein the at least one processor and at least one memory are communicably coupled and reestablishing 322, by the at least one processor, based on the opted-in wireless numbers at least one subscription service to at least one mobile device.

Figure 4:
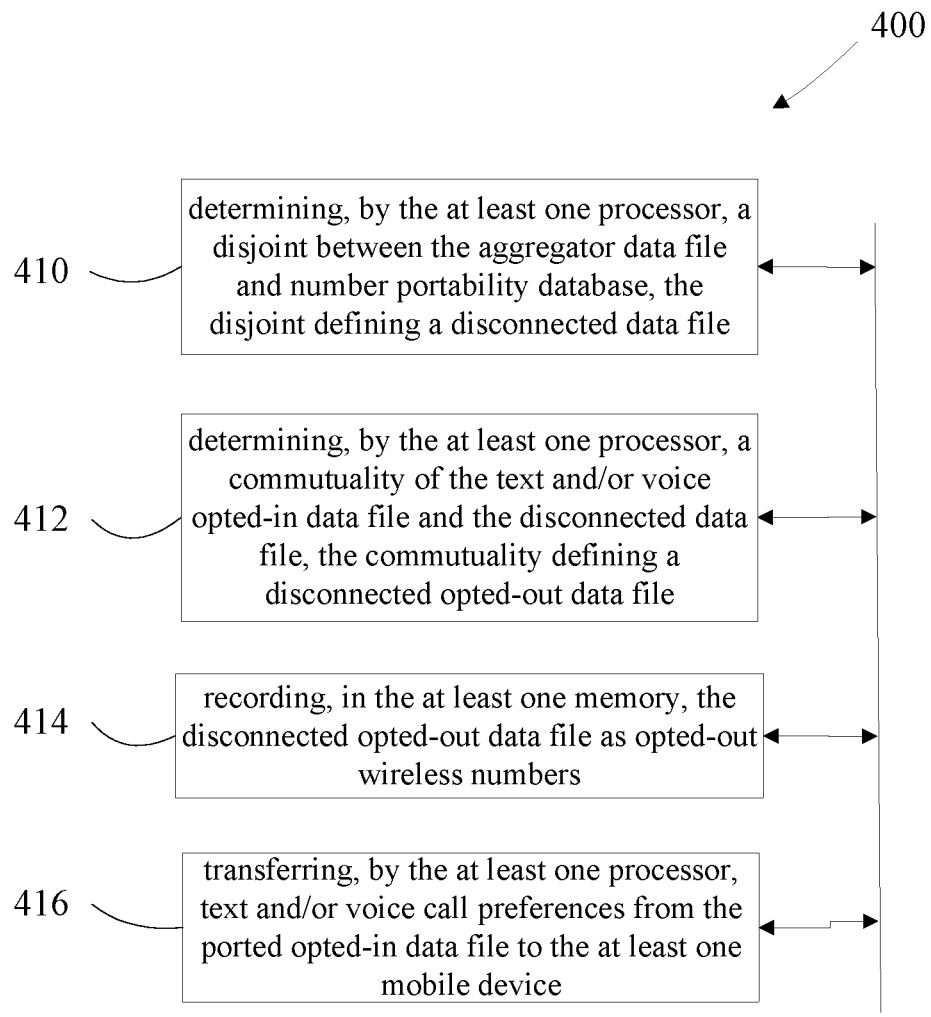
FIG. 4 depicts a second example method in accordance with one embodiment of the disclosure.

Referring now to FIG. 4, the method of FIG. 3 may further comprise, determining 410, by the at least one processor, a disjoint between the aggregator data file and number portability database, the disjoint defining a disconnected data file and determining 412, by the at least one processor, a commutuality of the text opted-in data file and the disconnected data file, the commutuality defining a disconnected opted-out data file. The method may further comprise recording 414, in the at least one memory, the disconnected opted-out data file as opted-out wireless numbers. The method may further comprise transferring 416, by the at least one processor, at least one of text and voice call preferences from the ported opted-in data file to the at least one mobile device and notifying, by the at least one processor, a subscriber of the transferring of at least one of text and voice call preferences to the at least one mobile device, wherein the at least one wireless number comprises at least one of a local routing number, a mobile directory number and a mobile identification number.

Figure 5:
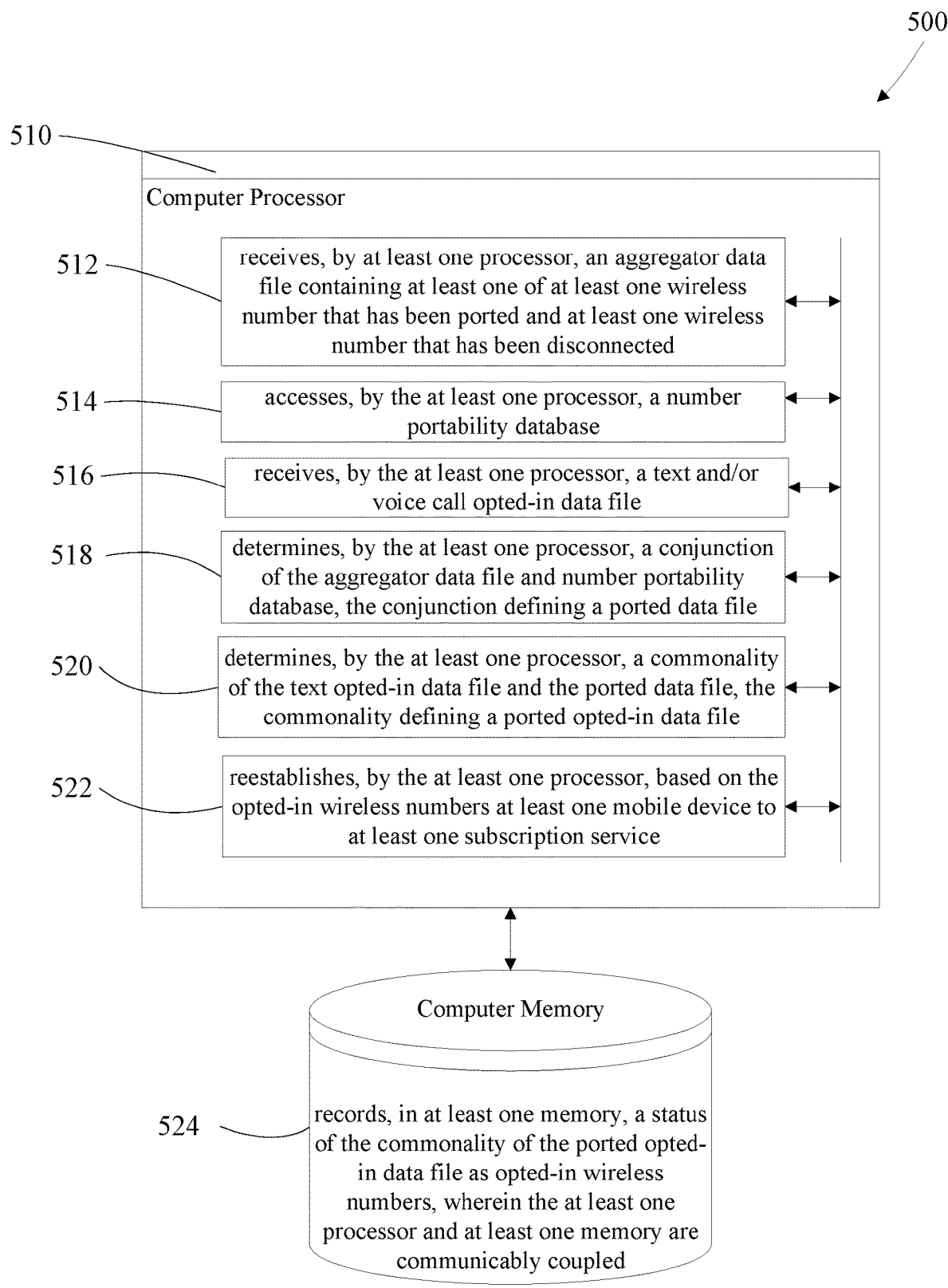
FIG. 5 depicts a second system example in accordance with one embodiment of the disclosure.
Figure 6:
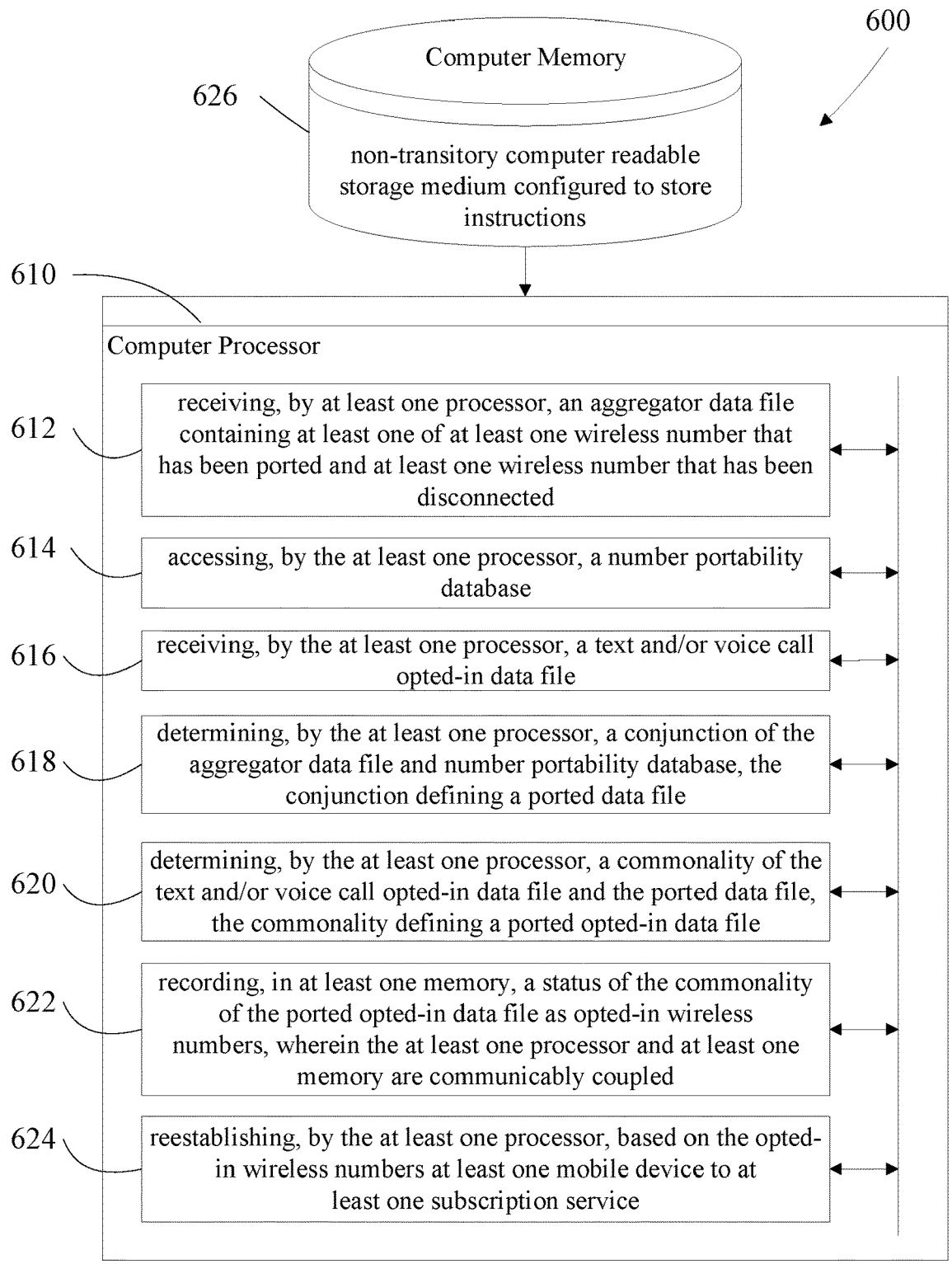
FIG. 6 depicts an example non-transitory computer readable medium in accordance with one embodiment of the disclosure.

FIG. 5 depicts an apparatus comprising at least one processor 510 that receives 512, by the at least one processor, an aggregator data file containing at least one of at least one wireless number that has been ported and at least one wireless number that has been disconnected, accesses 514, by the at least one processor, a number portability database and receives 516, by the at least one processor, at least one of a text and a voice call opted-in data file. The processor additionally determines 518, by the at least one processor, a conjunction of the aggregator data file and number portability database, the conjunction defining a ported data file and determines 520, by the at least one processor, a commonality of the at least one of text and voice call opted-in data file and the ported data file, the commonality defining a ported opted-in data file. The apparatus records 524, in at least one memory, a status of the commonality of the ported opted-in data file as opted-in wireless numbers, wherein the at least one processor and at least one memory are communicably coupled and reestablishes 522, by the at least one processor, based on the opted-in wireless numbers at least one mobile device to at least one subscription service.

The processor of the apparatus may further determine, by the at least one processor, a disjoint between the aggregator data file and number portability database, the disjoint defining a disconnected data file and determine, by the at least one processor, a commutuality of the at least one of text and voice call opted-in data file and the disconnected data file, the commutuality defining a disconnected opted-out data file and record, in the at least one memory, the disconnected opted-out data file as opted-out numbers. The apparatus processor may also transfer, by the at least one processor, at least one of text and voice call preferences in the ported opted-in data file to a mobile device and notify, by the at least one processor, a subscriber of the transfer of at least one of text and voice call preferences to the mobile device.

FIG. 5 depicts a non-transitory computer readable storage medium 626 to store instructions, that when executed cause at least one processor 610 to perform, receiving 612, by the at least one processor, an aggregator data file containing at least one of at least one wireless number that has been ported and at least one wireless number that has been disconnected, accessing 614, by the at least one processor, a number portability database and receiving 616, by the at least one processor, at least one of a text and a voice call opted-in data file. The processor also performs determining 618, by the at least one processor, a conjunction of the aggregator data file and number portability database, the conjunction defining a ported data file and determining 620, by the at least one processor, a commonality of the at least one of the text and the voice call opted-in data file and the ported data file, the commonality defining a ported opted-in data file. The memory performs recording 622, in at least one memory, a status of the commonality of the ported opted-in data file as opted-in wireless numbers, wherein the at least one processor and at least one memory are communicably coupled and reestablishing 624, by the at least one processor, based on the opted-in wireless numbers at least one mobile device to at least one subscription service.

The non-transitory computer readable storage medium may further comprise determining, by the at least one processor, a disjoint between the aggregator data file and number portability database, the disjoint defining a disconnected data file and determining, by the at least one processor, a commutuality of the at least one of text and voice call opted-in data file and the disconnected data file, the commutuality defining a disconnected opted-out data file. The memory may perform recording, in the at least one memory, the disconnected opted-out data file as opted-out wireless numbers and transferring, by the at least one processor, at least one of text and voice call preferences from the ported opted-in data file to a mobile device and notifying, by the at least one processor, a subscriber of the transfer of the at least one of the text and the voice call preferences to the mobile device, wherein the at least one wireless number comprises at least one of a local routing number, a mobile directory number and a mobile identification number.

Those skilled in the art will understand that the format, layout, and content of the data structure as shown in the figures is illustrative rather than limiting of the instant invention. Specifically, those skilled in the art will recognize that various changes, modifications, additions, omissions, or alterations may be made to the data structure shown without departing from the scope of the instant invention as recited in the claims appended hereto. More particularly, other types of computing devices both mobile and those which provide a server function may be utilized.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, this may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

The above examples are for illustrative purposes and are not intended to limit the scope of the disclosure or the adaptation of the features described herein to particular components. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced by examples in addition to those specifically described.

What is claimed is:

1. A method, comprising:
   receiving, by at least one processor, an aggregator data file containing at least one of at least one wireless number that has been ported and at least one wireless number that has been disconnected, wherein the aggregator data file contains only information pertaining to numbers that have been changed;
   receiving, by the at least one processor, a text opted-in data file;
   determining, by the at least one processor, a ported data file containing at least one wireless number which has not been disconnected and has been ported from one carrier to another based on the aggregator data file;
   comparing the ported data file and the text opted-in data file to determine which wireless numbers have been previously opted-in to text subscriptions; and
   sending the wireless numbers from the text opted-in data file to the mobile device to continue the text subscriptions.

2. The method of claim 1 further comprising determining, by the at least one processor, a disjoint between the aggregator data file and number portability database, the disjoint defining a disconnected data file.

3. The method of claim 2, further comprising determining, by the at least one processor, a commutuality of the text opted-in data file and the disconnected data file, the commutuality defining a disconnected opted-out data file.

4. The method of claim 3, further comprising recording, in at least one memory, the disconnected opted-out data file as opted-out wireless numbers, wherein the at least one processor and at least one memory are communicably coupled.

5. The method of claim 1, further comprising transferring, by the at least one processor, a text preference to the at least one mobile device.

6. The method of claim 5, further comprising notifying, by the at least one processor, a subscriber of the transferring the text preference to the at least one mobile device.

7. The method of claim 1, wherein the at least one wireless number comprises at least one of a local routing number, a mobile directory number and a mobile identification number.

8. An apparatus comprising at least one processor that:
   receives, by the at least one processor, an aggregator data file containing at least one of at least one wireless number that has been ported and at least one wireless number that has been disconnected, wherein the aggregator data file contains only information that pertains to numbers that have been changed;
   receives, by the at least one processor, a text opted-in data file;
   determines, by the at least one processor, a ported data file containing at least one wireless number which has not been disconnected and has been ported from one carrier to another based on the aggregator data file;

compares the ported data file and the text opted-in data file to determine which wireless numbers have been previously opted-in to text subscriptions; and sends the wireless numbers from the text opted-in data file to the mobile device to continue the text subscriptions.

9. The apparatus of claim 8, further determines, by the at least one processor, a disjoint between the aggregator data file and number portability database, wherein the disjoint defines a disconnected data file.

10. The apparatus of claim 9, further determines, by the at least one processor, a commutuality of the text opted-in data file and the disconnected data file, wherein the commutuality defines a disconnected opted-out data file.

11. The apparatus of claim 10, further records, in at least one memory, the disconnected opted-out data file as opted-out numbers, wherein the at least one processor and at least one memory are communicably coupled.

12. The apparatus of claim 8, further transfers, by the at least one processor, a text preference to a mobile device.

13. The apparatus of claim 12, further notifies, by the at least one processor, a subscriber of the transfer of the text preference to the mobile device.

14. A non-transitory computer readable storage medium to store instructions, that when executed cause at least one processor to perform:

receiving, by the at least one processor, an aggregator data file containing at least one of at least one wireless number that has been ported and at least one wireless number that has been disconnected, wherein the aggregator data file contains only information pertaining to numbers that have been changed;

receiving, by the at least one processor, a text opted-in data file;

determining, by the at least one processor, a ported data file containing at least one wireless number which has not been disconnected and has been ported from one carrier to another based on the aggregator data file;

comparing the ported data file and the text opted-in data file to determine which wireless numbers have been previously opted-in to text subscriptions; and sending the wireless numbers from the text opted-in data file to the mobile device to continue the text subscriptions.

15. The non-transitory computer readable storage medium of claim 14, further comprising determining, by the at least one processor, a disjoint between the aggregator data file and number portability database, the disjoint defining a disconnected data file.

16. The non-transitory computer readable storage medium of claim 15, further comprising determining, by the at least one processor, a commutuality of the text opted-in data file and the disconnected data file, the commutuality defining a disconnected opted-out data file.

17. The non-transitory computer readable storage medium of claim 16, further comprising recording, in at least one memory, the disconnected opted-out data file as opted-out wireless numbers, wherein the at least one processor and at least one memory are communicably coupled.

18. The non-transitory computer readable storage medium of claim 14, further comprising transferring, by the at least one processor, a text preference to a mobile device.

19. The non-transitory computer readable storage medium of claim 18, further comprising notifying, by the at least one processor, a subscriber of the transfer of the text preference to the mobile device.

20. The non-transitory computer readable storage medium of claim 14, wherein the at least one wireless number comprises at least one of a local routing number, a mobile directory number and a mobile identification number.

\* \* \* \* \*